United States Patent

[11] 3,570,670

[72] Inventors Masaaki Endo
Saitama-ken;
Takato Kawasaki, Kanagawa-ken; Mituo Miura, Tokyo; Yoko Ikuta, Kanagawa-ken; Masashi Suzuki, Chiba-ken; Tateo Kawamura, Tokyo; Minoru Okazaki; Hajime Seo; Toshio Okazaki; Katsumi Tagomori; Shiro Takahashi; Noboru Yamada, Kanagawa-ken, Japan
[21] Appl. No. 834,312
[22] Filed June 18, 1969
[45] Patented Mar. 16, 1971
[73] Assignees Kurita Water Industries Ltd.;
Takenaka Komuten Co., Ltd.
[32] Priority June 24, 1968, Feb. 24, 1969
[33] Japan
[31] 43/43382 and 44/13162

[54] APPARATUS FOR TREATING MUDDY WATER
6 Claims, 8 Drawing Figs.
[52] U.S. Cl. .................................................. 210/112,
210/262, 210/297, 210/388, 210/512

[51] Int. Cl. .................................................. B01d 21/26,
B01d 50/00
[50] Field of Search ........................................ 210/295,
297, 298, 512, 84, 83, 320, 258, 261, 262, 388, 112

[56] References Cited
UNITED STATES PATENTS

| | | | |
|---|---|---|---|
| 3,312,347 | 4/1967 | Weisenborn .................. | 210/295X |
| 3,341,983 | 9/1967 | Baldenhofer et al .......... | 210/512X |
| 3,433,361 | 3/1969 | Odes ............................. | 210/298X |
| 3,456,797 | 7/1969 | Marriott ....................... | 210/512X |
| 3,457,169 | 7/1969 | Schneider ..................... | 210/295X |

Primary Examiner—J. L. Decesare
Attorney—Woodhams, Blanchard and Flynn

ABSTRACT: An apparatus for treating muddy water comprising a vibrating screen, a separating tank, a hydraulic cyclone, a chute for discharging solid components, a cement hopper and a mixer, all of which are incorporated to form a compact unitary system.

APPARATUS FOR TREATING MUDDY WATER

BACKGROUND OF THE INVENTION

1. Field of the Invention

The present invention relates to an apparatus for treating a high density suspension including mud and sand which suspension is obtained, for example, by excavating muddy water in the civil engineering and the construction industry, so as to separate, thicken and dewater the mud and sand from the suspension.

2. Description of the Prior Art

Conventional apparatus of this kind is not capable of continuously separating, thickening and dewatering mud and sand from muddy water, because the conventional devices are utilized independently of each other for carrying out individual process steps without any consideration being given to providing a systematic arrangement or to providing a mutual interrelationship between the various devices.

Accordingly, the prior art treatments are performed in such a very crude manner that serious drawbacks result not only because of deficient performance capability but also because of the public ill effect of the environmental pollution that may result.

SUMMARY OF THE INVENTION

An object of the present invention is to provide an apparatus for treating muddy water with a remarkably high efficiency, wherein the mechanical devices for separating, dewatering and thickening the mud and sand from muddy water are incorporated in a unified system so that continuous treatment of said muddy water can be carried out without any of the drawbacks such as are encountered in the prior art.

Another object of the present invention is to provide an apparatus having the capability of effecting smooth and effective separation of solid components from muddy water and for dewatering as well as thickening of said solid components, which apparatus is easy to operate and which minimizes environmental pollution.

Still another object of the present invention is to provide an apparatus having the capability to solidify and solid components, which are included in muddy water and which are difficult to dewater, by cementing them into massive lumps so that the lumps can be easily transported for disposal or for utilization in reclaiming work.

A further object of the present invention is to provide an apparatus having the capability to treat muddy water by separating therefrom mud and sand together with solid components included therein to a sufficient extent that said treated muddy water can be reutilized or it can be disposed of without creating environmental pollution effects.

A still further object of the present invention is to provide an apparatus comprising a vibrating screen for screening massive particles of mud and gravel from a high density suspension including mud and sand which is distributed evenly on the screen, the openings of said screen always being kept open by a suitable means of high efficiency.

Another object of the present invention is to provide an apparatus comprising a mechanism for controlling the quantity of cement to be mixed with the mud and sand included in the muddy water.

DESCRIPTION OF THE PREFERRED EMBODIMENTS

Figure 1:
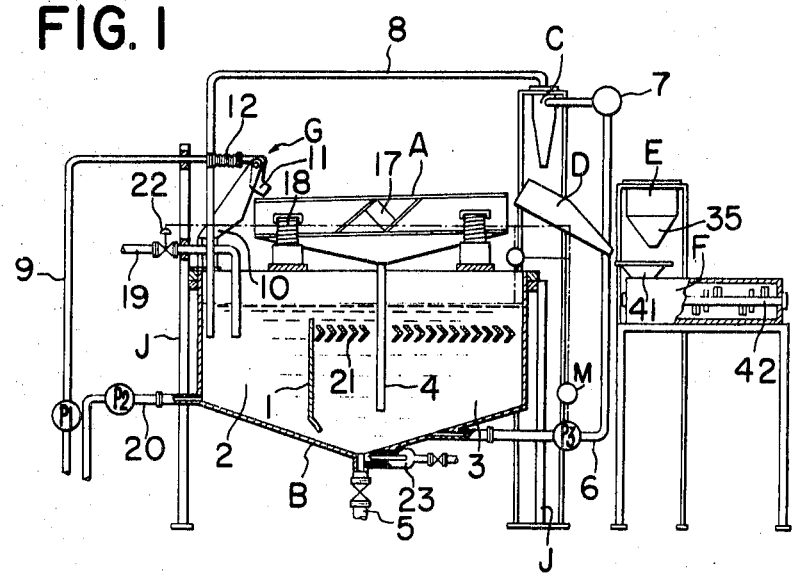
FIG. 1 is a partial cross-sectional front view of an embodiment of the present invention.

Referring to FIG. 1, reference letter A designates a vibrating screen. Above said screen adjacent one end thereof there is disposed a feeding mechanism G for feeding raw muddy water. A chute D is provided adjacent the other end of the screen A for discharging mud and sand.

Under said vibrating screen, there is provided a separating tank B having therein a purifying chamber 2 and a thickening chamber 3 which are separated from each other by a partition 1; the purifying chamber 2 and the thickening chamber 3 communicate with each other through openings in the upper and lower portions of said partition 1.

A muddy water induction tube 4 extends downwardly from said vibrating screen A to adjacent the bottom of said thickening chamber 3. At the bottom of said thickening chamber, there is provided a mud discharging pipe 5 and closely above it there is also provided an opening to which is connected one end of a muddy water discharge pipe 6. The muddy water discharge pipe 6 with a pump P3 therein and the other end of said pipe is connected tangentially with upper sidewalls of a plurality of hydraulic cyclones C disposed above said chute D, through a header 7.

A waste pipe 8 is connected to the upper center part of the cyclone C at one end and its other end extends into the purifying chamber 2 in the separating tank B. The outlet of the chute D and the outlet of a cement hopper E extend toward an inlet 41 of a mixer F.

The purifying chamber 2 in the separating tank B is further provided with a water supply pipe 19 and with a liquid discharge pipe 20 through which treated water in the purifying chamber is discharged by means of a pump P2. Also, in the thickening chamber 3 are provided several flow adjusting members 21 having their upper ends positioned lower than the upper end of the partition 1.

Further, the separating tank B is provided with a liquid level controlling mechanism which, by monitoring the liquid level, controls the motor of a pump P3 disposed in the muddy water discharge pipe 6 as well as a valve 22 in the water supply pipe 19 so as to keep the liquid level in the tank B higher by a predetermined amount than the upper end of the partition 1.

Adjacent to the mud charging pipe 5 at the bottom of the separating tank B, there is approved an injection pipe 23 for injecting high-pressure water in order to prevent blocking of the pipe 5.

Figure 2:
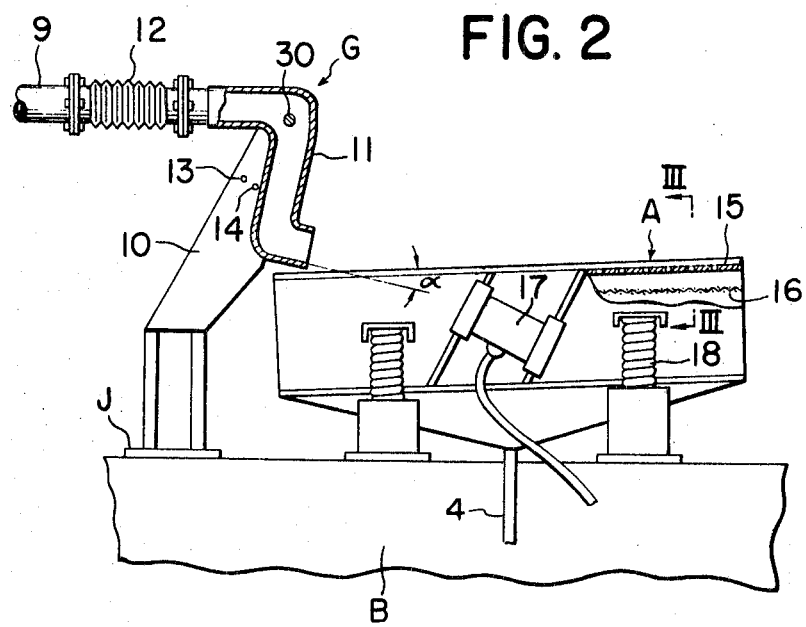
FIG. 2 is a partial cross-sectional front view of the vibrating screen in FIG. 1.
Figure 4:
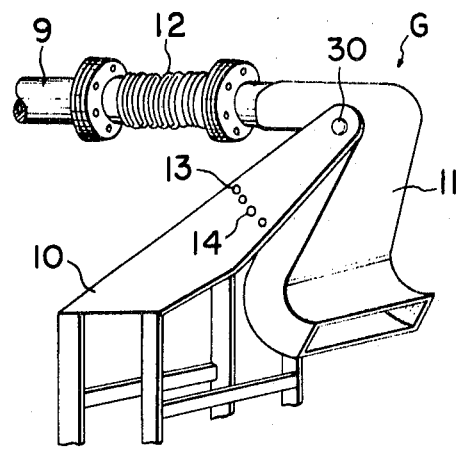
FIG. 4 is a perspective view of the raw material feeding mechanism.

Referring to FIGS. 2 and 4, one or more feeding members 11 of the mechanism G for feeding raw muddy water is connected with a feedpipe 9 by means of a flexible pipe 12. The feeding pipe 9 has a pump P1, therein. The feeding member 11 has a generally Z-shape and the cross section of its opening is enlarged progressively toward its lower end. The feeding member 11 is journaled by a pivot 30 on yokes 10 secured to a frame J. Several holes 13 are provided in the yokes 10 just below said pivot 30.

A threaded rod 14 is inserted removably into a selected pair of the holes 13 on the yokes 10 so that the position of said screwed rod is adjustable so as to define an adjustable feeding angle of the feeding members 11. The feeding members 11 are adjusted upwardly with regard to the screening surface of the screen when the solid substances included in the muddy water are comparatively soft, and they are adjusted downwardly, when the solid substances are hard. After the proper adjustment of the position of the threaded rod 14, the rod is secured in position by means of nuts (not shown) threaded onto the rod.

Figure 3:
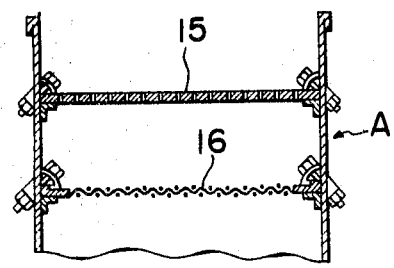
FIG. 3 is a cross-sectional view taken along the line III—III in FIG. 2.

As shown in FIGS. 2 and 3, the vibrating screen A is provided with two screen or filter media, the upper one consisting of a flat perforated plate 15 with a number of relatively large size holes therethrough and the lower one consisting of a wire mesh 16 having comparatively small sieve openings. The large size solids, which are comparatively fragile, are screened by the upper screen media 15, while, the comparatively small but less fragile substances are screened by the lower screen media 16, in order to obtain a higher efficiency in dewatering and separating solids from the muddy water. A vibrator 17 and springs 18 are coupled to the screen A.

Figure 5:
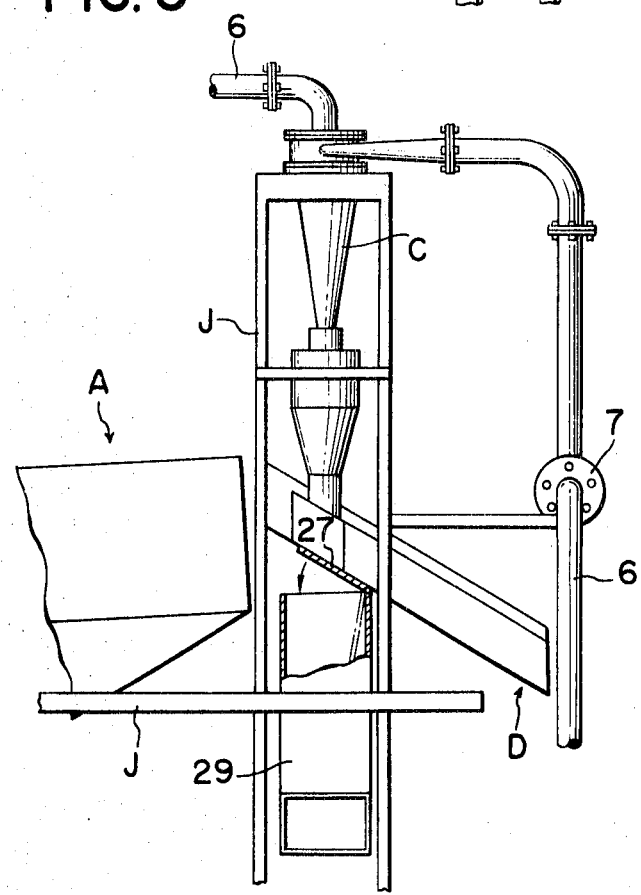
FIG. 5 is a partially sectioned front view of a hydraulic cyclone portion of the apparatus shown in FIG. 1.
Figure 6:
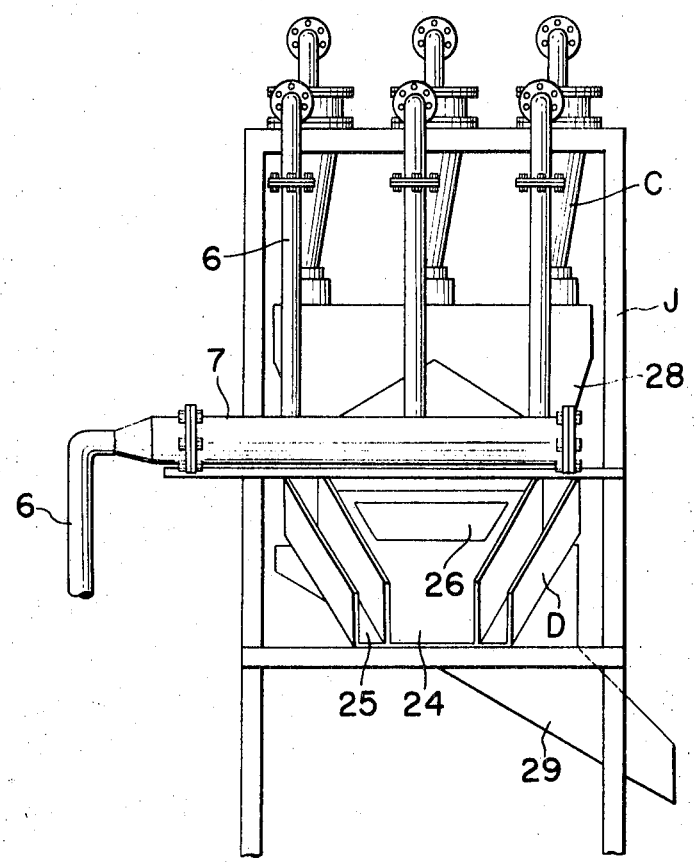
FIG. 6 is a side view of the cyclone in FIG. 5.

As illustrated in FIGS. 5 and 6 in detail, the passage of chute D is divided by separating plates into three passages, namely a central passage 24, and right and left passages 25. The large size mud and sand, after being dewatered and separated by the vibrating screen, passes through said central passage 24. An opening is provided in the bottom of the passage 24 and is adapted to be closed by a damper 27. The particles of mud and sand, which have been separated and thickened by the hydraulic cyclones C, are distributed by right and left hoppers 28 into the right and the left passages 25 through which they are discharged into the mixer F.

In this case, when the large mud and sand which is fed to the chute D from the vibrating screen, has a low ratio of retained water, said damper 27 is opened so as to permit said mud and sand to drop into a lower auxiliary chute 29 for discharging it from the system, but when the amount of retained water is still high, the damper 27 is closed and the mud and sand are discharged to the mixer F.

In the apparatus of the present invention, constructed just as above-mentioned, muddy water is fed to the vibrating screen A through pipe 9 by operation of the pump P1 and then the large size mud and sand separated and dewatered by the vibrating screen A is discharged into the chute D. In the meantime, muddy water, which has passed through the screen media of vibrating screen A flows into the thickening chamber 3 in the separating tank B through the mud-discharge tube 4.

The components of the muddy water that have a higher density settle down to the bottom of the thickening chamber 3, and the components having a lower density flow into the purifying chamber 2 over the upper end of the partition 1. The excess muddy water of low density is discharged outward from said chamber.

Upon operation of the vibrating screen, with muddy water being supplied by the feeding mechanism 11 onto the upper screen media, i.e., the flat perforated plate 15, the muddy water moves on the perforated plate and during its course of movement, the liquid slurry portion and small particles pass through the perforated holes having the comparatively large diameter and drop downwardly. However, larger size mud and sand particles having considerable brittleness do not pass through said holes, but instead are led to the chute D from the end of said plate 15. They still maintain their initial shape, without any destruction by the shock of vibration, because of the flatness of the pathway.

On the other hand, the liquid slurry which passes downwardly through the holes in plate 15 moves onto and then along the wire net 16 having the comparatively smaller sieve openings in the same direction as mentioned above. While it moves therealong, dewatering of the smaller particles is carried out almost to a perfect extent. The particles dewatered in such a manner are then fed to the chute D from the end of the wire net.

The muddy water of high density which settles down adjacent to the bottom of the thickening chamber 3 is fed into the hydraulic cyclone C tangentially by passing through the muddy water discharging pipe 6 assisted by operation of a pump P3 and through the header 7.

Once fed into the hydraulic cyclone C, the mud and sand particles included in the muddy water are separated therefrom and after thickening are discharged downwardly to the chute D. On the other hand, the liquid of low density overflows from the upper portion of the hydraulic cyclone and returns through the waste pipe 8 to the purifying chamber 2, and small particles of mud and sand still contained therein settle down into the lower portion of said chamber and then through the lower opening of the partition 1 enter into the thickening chamber 3.

The mud, which settled at the bottom of the thickening chamber 3 in such a manner as above-mentioned, is taken out by opening the mud discharging tube 5 provided in said chamber and then is cast away.

When the particles of mud and sand discharged to the chute D as above-mentioned contain clays or silt which are very difficult to dewater, they should be supplied to the mixer together with cement from the cement hopper E and, after mixing, they are discarded.

Figure 7:
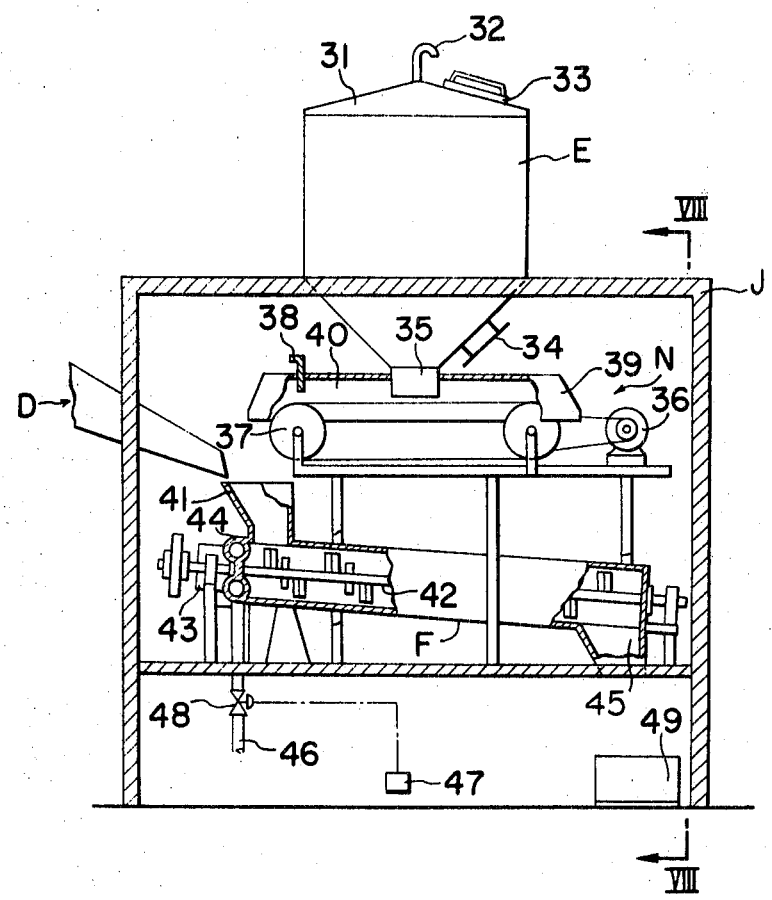
FIG. 7 is a cross-sectional view of a cement hopper and a mixer of an alternate embodiment of the present invention taken along the line VII—VII in FIG. 8.
Figure 8:
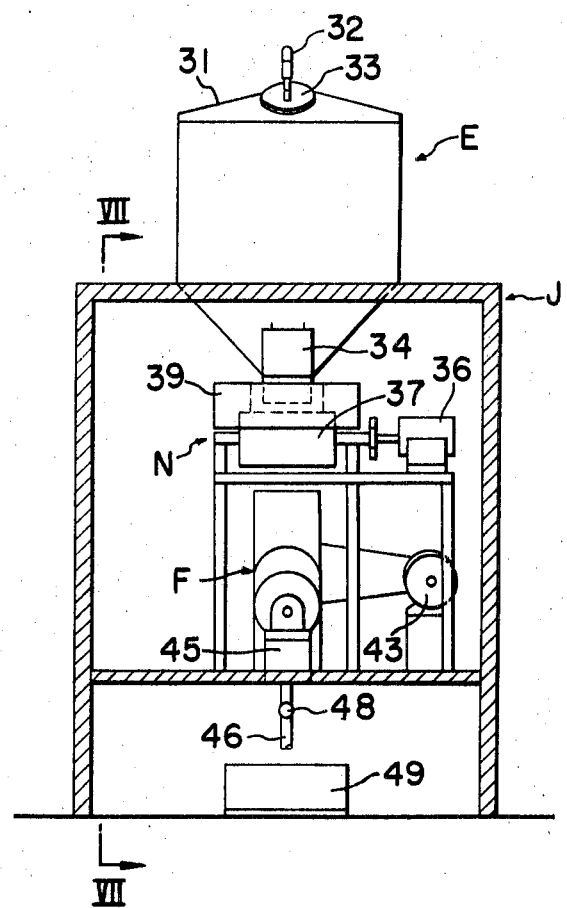
FIG. 8 is a cross-sectional view taken along the line VIII—VIII in FIG. 7.

FIGS. 7 and 8 show a cement hopper and a mixer of an alternate embodiment of the present invention. Reference letter J designates a frame portion, a thereabove is provided a cement hopper E. On the cover 31 of the cement hopper is disposed an air discharging pipe 32 which curves downwardly. A cover 33 is also provided to close the cement inlet opening defined on said cover 31. In addition, on the lower slanted side of said hopper, a vibrator 34 is provided.

A belt conveyor 37 is disposed underneath an outlet 35 of the hopper E and it is operated by a driving motor 36.

Further, a cover 39 including a flow adjusting damper 38 is provided to cover the upper surface of said belt conveyor 37 and it defines a chamber 40 for relieving fluctuation of the cement flow. Adjacent to the idler roller of said belt conveyor, namely at the discharge end thereof, the discharge outlet of the chute D opens.

Still further, there is provided a mixer F having an inlet 41 opening toward both said discharging members above-mentioned and its stirring shaft 42 is driven by a motor 43.

At the end of said mixer adjacent to the inlet 41, there is provided a spray nozzle 44 for cleaning the mixer. At the other end of the mixer there is provided an outlet 45. A water supply pipe 46 for said nozzle 44 is provided with a solenoid valve 48, which is controlled by a timer 47, and under said outlet 45 is located a mixture, receiving box 49.

Now, regarding operation of these mechanisms, a description will be made for each unit or mechanism mentioned thus far.

First, cement held within the hopper E is discharged therefrom through its outlet 35 onto the belt conveyor 37. During this operation, the discharge of cement can be carried out very smoothly because of the vibrating action of a vibrator 34, as well as by the draft the air discharge pipe 32 due to fluctuating pressure accompanied by the discharged cement.

Cement is moved along by movement of said belt conveyor 37, but it may be restricted in its movement by adjusting the position of a damper 38 placed just above the conveyor. Because of this restriction of movement, excess is retained in the chamber 40 for preventing fluctuation of the quantity discharged, and accordingly the desired quantity of cement is fed from the discharging end of said conveyor toward the inlet 41 of the mixer F.

On the other hand, from the chute D the massive mud and sand of desired density, just the same as in the embodiment previously mentioned, is fed into the inlet 41 of the mixer F. At or around the inlet of the mixer, the cement and the massive mud and sand meet together and then they are mixed together by rotation of the stirrer shaft 42 within the mixer F. The mixture leaving the outlet 45 is received by a mixture receiving box 49. In addition, before and after the operation of the mixer, the mixer should be cleaned by water supplied through the spray nozzle 44 and from the water supplying pipe 46. The supply of water is controlled by a solenoid valve 48 actuated by a timer 47.

We claim:
1. An apparatus for treating muddy water, comprising:
   a separating tank having a partition therein dividing same into a purifying chamber and a thickening chamber, said purifying chamber and said thickening chamber being in liquid flow communication with each other adjacent the upper and lower ends of said partition, said thickening chamber having a mud discharge pipe at the bottom thereof and also having a muddy water outlet positioned above said mud discharge pipe;

a vibrating screen device positioned above said separating tank and having a muddy water induction tube extending downwardly therefrom, the lower end of said induction tube being located adjacent to the bottom of said thickening chamber for introducing filtered muddy water from said screen device into said thickening chamber;

at least one hydraulic cyclone located at the upper portion of said apparatus, said cyclone having an inlet in the upper sidewall thereof, a liquid outlet at the upper end thereof and a solids outlet at the lower end thereof;

a muddy water discharge conduit extending from said muddy water outlet of said thickening chamber to said inlet of said cyclone, said muddy water discharge conduit having a pump therein for pumping muddy water from said thickening chamber to said cyclone;

waste conduit means extending from said liquid outlet of said cyclone to said purifying chamber for transferring liquid discharged from said cyclone into said purifying chamber;

a discharge chute positioned below said solids outlet of said cyclone for receiving solids discharged therefrom, said discharge chute also being positioned below the outlet of said screen device for receiving solids therefrom;

a cement hopper having an outlet; and a mixer having an inlet which opens toward and discharge end of said chute and said hopper outlet for receiving solids and cement therefrom, respectively, said mixer including means for mixing together said solids and said cement.

2. An apparatus according to claim 1, including a frame, a raw muddy water feeding device journaled on said frame and adapted for feeding raw muddy water onto said screen, said feeding device having a substantially Z-shaped passage whose cross-sectional area is progressively enlarged from the inlet to the outlet thereof, and an angle-adjusting mechanism mounted on said frame for adjusting the angular relationship between said feeding device and said screen device.

3. A apparatus according to claim 1, in which said vibrating screen device comprises an upper screen medium and lower screen medium, said upper screen medium comprising a flat perforated plate having holes of comparatively large diameter, said lower screen medium comprising a wire mesh having sieve openings of comparatively small size.

4. An apparatus according to claim 1, in which a feeding mechanism is provided between said hopper outlet and said mixer inlet, said feeding mechanism including means for regulating the rate of feeding cement into said mixer inlet.

5. An apparatus according to claim 1, including a liquid level control device for controlling in the operation of said pump in response to the liquid level in the separating tank.

6. An apparatus according to claim 1, in which said chute is divided by separating plates into a central passage and side passages on opposite sides of said central passage, said central passage being disposed from receiving solids discharged from said screen device and said side passages being disposed for receiving solids discharged from said cyclone, said central passage having an opening through the bottom thereof and a damper for selectively closing said opening.